May 2, 1961 W. K. MAENPAA 2,982,851
CAB SIGNALING SYSTEM FOR RAILROADS
Filed June 28, 1955
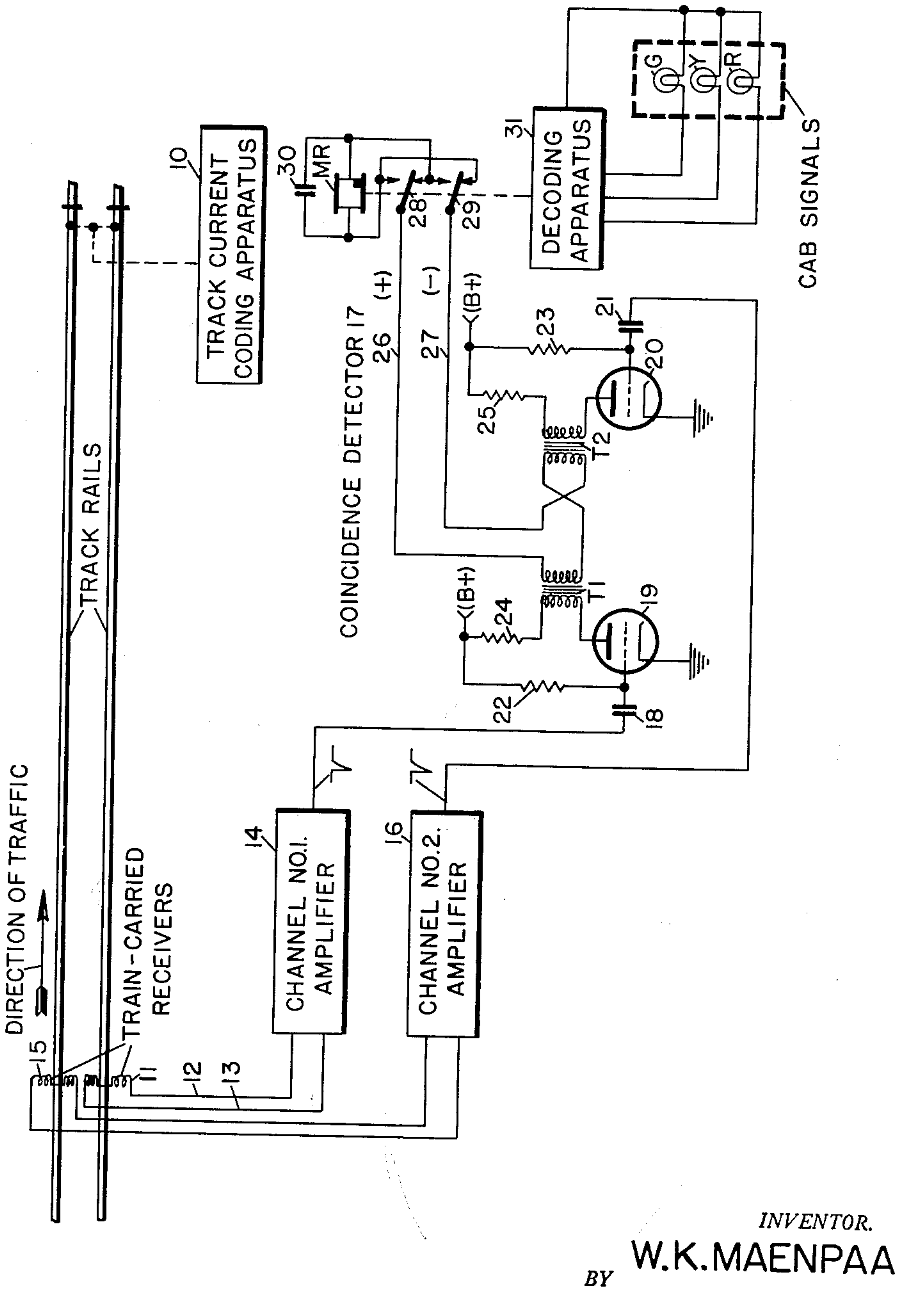
INVENTOR.
W.K.MAENPAA
BY Forest B. Hitchcock
HIS ATTORNEY United States Patent Office 2,982,851

Patented May 2, 1961

2,982,851

CAB SIGNALING SYSTEM FOR RAILROADS

Wilho K. Maenpaa, Rochester, N.Y., assignor to General Railway Signal Company, Rochester, N.Y.

Filed June 28, 1955, Ser. No. 518,490

4 Claims. (Cl. 246—63)

This invention relates to cab signaling systems for railroads and more particularly pertains to an improved coincidence detection circuit organization for a two-channel, cab signal amplifier.

In coded track circuit signaling systems, pulses of current are applied to the track rails at the exit end of each track section. Any one of various coding rates for the track pulses can be used dependent upon existing traffic conditions, and the resulting rail pulses are received at the entrance end when the track section is unoccupied and produce intermittent operation of the track relay at that end. The rate of operation of this relay determines the signal aspect displayed to trains entering the track section.

Trains operating over track circuits supplied with such coded rails currents can be provided with continuous inductive cab signaling apparatus so that signal indications can be continually received on the train. To accomplish this, one or more vehicle-carried receiver coils is mounted ahead of the front wheels of the locomotive so that voltages are induced therein by the rail current pulses. The induced voltages are then amplified and from them the coding rate of the rail current is determined and used to distinctively control the cab signals.

A cab signaling system has been developed in which the receiver coils are each tuned to a distinctive frequency different from that of any steady-state rail current likely to be encountered in the track rails. As a result, distinctive transient voltages are induced in the receiver coils having frequency characteristics dependent principally upon the resonant receiver coil frequency rather than the frequency of the "on" periods of the coded rail currents. Substantially the same kind of transient voltages are thus induced in the receiver coils for different frequencies of alternating current comprising the rail current "on" periods and even for those situations where the "on" periods comprise direct current. Consequently, the same amplifying and decoding apparatus may be used without change-over as a vehicle operates over various track sections having these different kinds of coded rail currents. A cab signaling system of this kind is disclosed in the patent of H. C. Kendall and F. P. Zaffarano, No. 2,731,552, issued January 17, 1956; on application Ser. No. 227,164, filed May 19, 1951; and in the patent of F. P. Zaffarano and W. K. Maenpaa, No. 2,731,553, issued January 17, 1956, on application Ser. No. 241,576, filed August 13, 1951.

In the system disclosed in these applications, a distinctive transient voltage is induced in each receiver coil both by the application and the removal of each pulse of rail current. Special amplifier means is associated with each receiver so that the induced transient voltages may be individually amplified. Each amplifier is organized to amplify the distinctive transient, but to attenuate sharply other frequencies such as stray power current frequencies and the steady-state component of the rail current "on" periods. The output of each amplifier then generally comprises a single voltage pulse for each beginning and each end of a track current pulse. The two amplifier outputs are then applied to a coincidence detecting circuit organization that is effective to provide an output only if its two inputs are in coincidence, thereby signifying that the transient voltages were induced simultaneously in both receiver coils. This requirement of coincidence ensures that extraneous outputs cannot be applied to the coding apparatus as a result of stray rail currents, magnetized rail spots, and the like which ordinarily are not able to induce similar voltages simultaneously in both receiver coils.

More specifically, the coded rail currents utilize both tracks to complete a circuit so that each rail pulse travels in one direction down one track rail and in the opposite direction up the other track rail. The two receiver coils are poled to provide inputs of the same polarity to their respective amplifying channels in response to these opposite polarities of track current. Stray track currents, in contrast, generally transverse both rails in the same direction and thus induce voltages in their respective receiver coils which are ineffective to produce outputs of the coincidence detecting means because of their out-of-phase condition as compared to the voltages induced by legitimate code pulses. In a similar way, any other condition tending to cause spurious outputs, such as magnetized rail spots, that ordinarily affect only one receiver at a time are not able to produce outputs from the coincidence detecting means.

It is desirable that the coincidence detecting circuit organization provide an output only for closely coincident inputs to provide thereby the most protection against extraneous, out-of-phase inputs. Also, the coincidence detecting means should preferably be organized to be fail-safe so that any circuit fault is self-revealing and will not permit single channel operation, i.e. operation that results in the generation of an output from the coincidence detecting means when it receives but a single input from one of the amplifier channels.

The coincidence detecting means of this invention has, accordingly, been devised so that any circuit fault such as the opening or grounding of a connection, or the failure of an electron tube, will prevent any output from being supplied to the decoding apparatus. Although this coincidence detection means is particularly applicable to the cab signaling system disclosed in the previously mentioned patent applications, its use is in no way limited to systems of this particular kind. It will be found to have utility for various types of cab signaling systems employing individual amplifier channels for the respective receivers when it is desired that an output be provided only for legitimate coded rail currents affecting both receiver coils simultaneously in the same manner.

Described briefly, the coincidence detecting means comprises two electron discharge tubes, each receiving on its grid-cathode circuit the output voltage of one of the respective amplifier channels. The plate-cathode circuit of each tube includes one winding of a transformer. The secondary windings are connected in series so that their combined outputs can add to provide the energy required to operate an electromagnetic relay. When either of the electron discharge tubes becomes inoperative in such a manner that its current cannot be changed by the output voltage from the associated amplifying channel, the output of the series-connected transformer windings is so reduced that the relay cannot be operated.

An object of this invention is to provide a coincidence detecting circuit organization that is fail-safe by not providing an output in the event of any circuit fault.

Another object of this invention is to provide a fail-safe coincidence detecting circuit means comprising two electron tubes, each effective to control the input energy to a respective transformer and with the output windings of the transformers being connected so that their combined energy operates an electromagnetic relay.

Other objects, purposes, and characteristic features of this invention will be obvious from the drawing and also pointed out as the description of the invention progresses.

In describing this invention in detail, reference will be made to the accompanying drawing disclosing one form of this invention. In the drawing, the symbol (B+) and the symbol for a ground connection indicate connections to the opposite terminals of a source of power suitable for the operation of electron tubes.

In the drawing, track current coding apparatus 10 is shown as being associated with the track rails at the exit end of a track section. This track current coding apparatus may assume any of several different forms, all of which are well-known in the prior art. Most commonly this apparatus causes pulses of current to be applied at selected code rates to the track rails with the "on" periods of the code being substantially equal in length to the "off" periods. In practice, the most commonly used code rates for the different traffic conditions are 75, 120, and 180 pulses per minute. The track current may comprise "on" periods of direct current or of alternating current of any suitable frequency such as 100 or 60 cycles per second.

The vehicle-carried equipment includes two receivers 11 and 15, one for each of the track rails. These receivers are so positioned on the locomotive ahead of the front wheels that they can be inductively affected by the changing rail current. Thus, as in the cab signaling system disclosed in the above-mentioned patent applications, each application and each removal of a code pulse from the track rails results in a transient voltage being induced in both receiver coils simultaneously.

Each receiver supplies its induced voltage over a pair of wires to a corresponding amplifying channel. The voltage induced in receiver 11, for example, is applied over wires 12 and 13 to the channel No. 1 amplifier 14. The voltage induced in the other receiver 15 is similarly applied to the input of channel No. 2 amplifier 16. The induced receiver voltages are individually amplified in these two amplifier channels. Various expedients may be used in these amplifier channels to reduce the effectiveness of extraneous voltages appearing across the receiver coils. For example, tuned degenerative circuits, feedback circuit organizations, and other means may be used as particularly disclosed in the above-mentioned Zaffarano and Maenpaa Patent No. 2,731,553 to ensure that the respective amplifier channels provide outputs only for transient voltages induced by the legitimate coded rail current.

Each of the amplifier channels is organized so that it provides, in response to each induced transient voltage, a negative-going output pulse. As described, these output pulses will occur in time coincidence only in response to legitimate coded rail currents which are effective to induce similar transient voltages simultaneously in both receivers.

The coincidence detector 17 comprises two electron discharge tubes which may be of the triode type as shown in the drawing. The output of channel No. 1 amplifier 14 is applied through a coupling capacitor 18 to the control grid of tube 19, and the output of the channel No. 2 amplifier 16 is similarly supplied to the grid of tube 20 through capacitor 21. The grids of the tubes 19 and 20 are connected respectively through resistors 22 and 23 to (B+), and both tubes have their cathodes connected directly to ground. The plate of tube 19 is connected through the primary winding of a transformer T1 and through current limiting resistor 24 to (B+). The plate of tube 20 is connected in a similar manner through the primary winding of transformer T2 and through current limiting resistor 25 to (B+). The secondary windings of these transformers T1 and T2 are connected in series with their output polarities properly observed so that the voltages simultaneously induced in them from their primary windings will be in phase.

Changes of current in the primary windings of transformer T1 and T2 cause voltages to be induced in the secondary windings so that a voltage then appears between wires 26 and 27. These wires are connected to the winding of relay MR through pole-changing contacts 28 and 29 so that this relay can be operated back and forth between its opposite conditions alternately in a manner to be described subsequently in greater detail.

Both tubes 19 and 20 are normally in fully conductive conditions because their grids are connected through resistors 22 and 23 respectively to the (B+) source. The grid of each tube is essentially at ground potential since any attempt of the grid to rise above this point of voltage causes a flow of grid current and a resulting reduction of grid voltage. With both tubes 19 and 20 in this conductive condition, there is a substantial flow of plate current through the primary windings of transformers T1 and T2. This current is limited to a suitable value by the resistors 24 and 25, respectively.

When either tube 19 or 20 receives a negative-going pulse from its respective amplifier channel, the voltage at the grid of the tube is driven momentarily negative by a sufficient amount to drive the tube to a cutoff condition. Since the input pulse is preferably of relatively short duration, as diagrammatically illustrated in the drawing, the corresponding tube is cut off for only a relatively short length of time. During this interval, however, the current through the transformer primary winding is abruptly reduced so that a voltage pulse is induced in the secondary winding.

When tubes 19 and 20 are driven to cutoff, the effect of the respective transformer primary winding is to attempt to maintain this current flow so that the upper terminal of each primary winding becomes positive with respect to the lower terminal. For an arbitrarily assumed polarity of the windings this causes the upper terminal of each secondary winding also to become positive with respect to the lower terminal. By connecting the lower terminal of the secondary winding of transformer T1 to the upper terminal of the secondary winding of transformer T2, these secondary windings are then connected in a polarity aiding sense. For this assumed polarity sense, the result of driving both tube 19 and 20 to cutoff is to make wire 26 of positive polarity with respect to wire 27. If relay MR is in its dropped-away condition as shown in the drawing, the positive polarity of voltage on wire 26 will cause current to flow from this wire 26 to back contact 28, through the winding of relay MR from right to left, and through back contact 29 of relay MR to wire 27. It will be assumed that this polarity of energization of relay MR causes the relay armature to pick up and close front contacts 28 and 29.

The next occurrence of simultaneous inputs to the coincidence detector 17 again causes wire 26 to assume a positive voltage with respect to wire 27. With the front contacts 28 and 29 now closed, however, current flows from wire 26, through front contact 28 of relay MR, through the winding of relay MR from left to right, and through front contact 29 of relay MR to wire 27. This opposite polarity of energization of relay MR results in the dropping away of its armature.

Relay MR is of the magnetic stick type as diagrammatically illustrated by the symbol representing this relay. Thus, the armature remains in its last-operated condition between successive energizations of its winding. Capacitor 30 is connected across the winding of relay MR and facilitates the operation of this relay in response to short periods of energization. Even though the energy pulses induced in the secondary winding of transformers T1 and T2 are of relatively short duration, they are effective not only to energize the winding of relay MR directly but also to charge capacitor 30. After each induced pulse has subsided, capacitor 30 can then discharge through the winding of relay MR and thereby provide additional operating energy for this relay.

If the negative-going input pulses to the grids of tubes 19 and 20 are not in the proper time coincidence, the two tubes will not simultaneously be cut off and there will then not be sufficient energy induced in the relay operating circuit to actuate relay MR. For example, if tube 19 is first driven to cutoff but tube 20 is not driven to cutoff until a later time when tube 19 has been restored to a conductive condition, a voltage will be induced first only in the windings of transformer T1. Since no voltage will at this moment be induced in the secondary winding of transformer T2, only half the voltage and half the current are effective in the circuit including the series-connected secondary windings. The energy then available to operate relay MR is, by this factor alone, reduced to approximately one fourth of the normal value, and this is far below that required to operate relay MR. In addition, the secondary winding of the ineffective transformer acts a series impedance in the circuit to reduce somewhat further the effectiveness of the induced energy in operating the relay MR.

A lack of coincidence of the inputs cannot produce an output from the coincidence detector even though one or both of the inputs is of considerably greater-than-normal amplitude. An input of large amplitude from one of the amplifying channels still cannot do more than to cut-off the respective tube 19 or 20 and this is no more effective than a normal sized input in inducing a voltage in the associated transformer.

Any circuit fault occurring with respect to the coincidence detector 17 and tending to reduce the ability of the input pulses to change abruptly the plate-cathode current of the corresponding tube 19 or 20 similarly results in insufficient energy being provided for operating relay MR. If, for example, either tube 19 or 20 burns out so that it cannot normally conduct plate current, there can then be no change in its plate-cathode current in response to a negative-going input pulse so that no voltage can then be induced in the windings of the respective transformer. Also, any opening or shorting of the wires supplying the input pulses to the two tubes 19 and 20 will result in inability to drive these tubes to cutoff. A short-circuiting or an open-circuiting of the windings of the two transformers T1 and T2 similarly results in inability to provide the required operating energy for relay MR. Thus, only when the coincidence detector 17 is in its proper operating condition, with both tubes normally conductive and both able to be cut off by a negative-going pulse from its respective channel amplifier, and only if such pulses are simultaneously received by both tubes, can the required energy be provided to operate relay MR.

The contacts of relay MR act upon decoding apparatus 31 illustrated in block form in the drawing. This decoding apparatus may be of the conventional tuned type commonly employed with coded track circuits and also with cab signaling apparatus in a manner well-known in the art or the decoding apparatus may be of the electronic code rate discriminator type disclosed in detail in the patent of Kendall and Zaffarano, No. 2,731,552, previously mentioned. In either event, the decoding apparatus 31 includes means for responding distinctively to the rate of actuation of relay MR and for selectively controlling the cab signals so that the proper signal aspect can be displayed in accordance with the coding rate and thus in accordance with existing traffic conditions.

Having described an improved coincidence detecting circuit organization for a cab signaling system as one embodiment of this invention, I desire it to be understood that various other forms and modifications may be used to meet the requirements of practice without in any manner departing from the spirit or scope of this invention.

What I claim is:

1. Rail pulse coincidence detecting means included in train-carried equipment for a cab signaling system of the continuous inductive type responsive to rail current applied to the track rails of track sections at different code rates selected in accordance with traffic conditions, said train-carried equipment comprising, a receiver coil for each rail being inductively affected by the changing rail current and having amplifier circuit means associated with each receiver coil to provide a distinctive output for each application and each removal of said current from said rails corresponding to the distinctive voltages induced in the respective receiver coils; said coincidence detecting circuit means including an electron discharge tube for each of said amplifier circuit means, each of said tubes having its plate-cathode current controllable by said distinctive output received from said associated amplifier circuit means, relay circuit means comprising a two-position relay of the kind remaining in its last-actuated position, transformer circuit means associated with both said tubes and being effective to provide operating energy for actuating said relay only when said distinctive outputs are simultaneously received by said coincidence detecting means, means including contacts of said relay for alternately reversing the polarity of application of said energy to said relay to cause it to operate alternately between said opposite positions in response to successive outputs of said coincidence detecting circuit means; said train-carried equipment also including decoding apparatus being differently responsive to each rate of operation of said relay in accordance with the coding rate of the rail current, and cab signals governed by said decoding means for displaying a distinctive signal indication on said train according to said code rate.

2. A code receiving system for a railway locomotive for inductively receiving track circuit codes transmitted through the rails of a stretch of track in advance of a locomotive comprising, receiver windings carried by the locomotive for inductively receiving energy from the respective track rails, amplifier circuit means connected to each of said windings for amplifying the potential induced in the associated winding, whereby for each code pulse applied to the track rails the respective amplifier circuit means provides substantially simultaneous outputs, relay means comprising a code-following polarized relay and including means maintaining said relay in its last-actuated position, coincidence detecting circuit means connected to the output of each amplifier circuit means for producing a distinctive output signal only upon the occurrence of simultaneous output signals from both said amplifier circuit means, energizing circuit means for said relay including pole changing contacts of said relay being coupled between the output of said coincidence detecting circuit means and the winding of said relay for operating said relay to its opposite positions alternately in response to successive outputs of said coincidence detecting circuit means, and means controlled by said relay to a distinctive condition dependent upon the rate of operation of said relay for indicating the rate at which said code pulses are applied to said track rails.

3. The code receiving system according to claim 2 wherein said code-following relay is of the magnetic stick type.

4. The code receiving system according to claim 2 wherein said coincidence detecting circuit means includes an electron tube for each said amplifier circuit means and the current of each tube is distinctively varied by the output of the respective amplifier circuit means and said coincidence detecting circuit means also includes circuit means for applying the outputs of the respective tubes in series connection through said energizing circuit means to the winding of said relay.

References Cited in the file of this patent

UNITED STATES PATENTS

| | | |
|---|---|---|
| 1,705,993 | Oswald | Mar. 19, 1929 |
| 1,864,789 | Baughman | June 28, 1932 |
| 2,148,718 | Agins | Feb. 28, 1939 |
| 2,500,212 | Starr | Mar. 14, 1950 |
| 2,731,550 | Stafford | Jan. 17, 1956 |
| 2,731,551 | Stafford | Jan. 17, 1956 |
| 2,731,552 | Kendall et al. | Jan. 17, 1956 |
| 2,731,553 | Zaffarano et al. | Jan. 17, 1956 |